United States Patent [19]

Poretti et al.

[11] 3,737,894

[45] June 5, 1973

[54] ENCODER FOR HIGH-SPEED PCM SYSTEM

[75] Inventors: Isidoro Poretti, Catiglione; Giancarlo Monti, Milan, both of Italy

[73] Assignee: Societa Italiana Telecomunicazioni Siemens S.p.A., Milan, Italy

[22] Filed: Oct. 28, 1971

[21] Appl. No.: 193,446

[30] Foreign Application Priority Data

Nov. 18, 1970 Italy ............................31877 A/70

[52] U.S. Cl. ..........................................340/347 AD

[51] Int. Cl. ..........................................H03k 13/06

[58] Field of Search ..............................340/347 AD; 235/61.11 E

[56] References Cited

UNITED STATES PATENTS

| | | | |
|---|---|---|---|
| 3,277,462 | 10/1966 | Sekimoto | 340/347 AD |
| 3,020,342 | 2/1962 | Robin | 235/61.11 E |

*Primary Examiner*—Thomas A. Robinson
*Attorney*—Karl F. Ross

[57] ABSTRACT

An analog signal to be encoded is fed in parallel to 16 comparison stages of 16 comparators each, every comparator working into an individual flip-flop to set it upon the occurrence of a reading pulse if the instantaneous signal amplitude surpasses a respective reference voltage selected in accordance with a predetermined coding characteristic spanning 16 amplitude ranges of 16 levels each. The outputs of the several flip-flops are selectively combined in a logic network deriving therefrom two halves of an eight-bit word; the first half, controlled by the highest-ranking comparison stage in which any comparator is operative to produce a finite output, determines the amplitude range whereas the second half, controlled by the highest-ranking operative comparator in that stage, determines the amplitude level within the designated range.

4 Claims, 6 Drawing Figures

Isidoro PORETTI
Giancarlo MONTI

INVENTORS

BY

Karl G. Ross

Attorney

Patented June 5, 1973 3,737,894

5 Sheets-Sheet 2

Isidoro PORETTI
Giancarlo MONTI

INVENTORS

BY Karl F. Ross

Attorney

Isidoro PORETTI
Giancarlo MONTI
*INVENTORS*

BY Karl F. Ross
Attorney

Isidoro PORETTI
Giancarlo MONTI

INVENTORS

BY Karl F. Ross

Attorney

Isidoro PORETTI
Giancarlo MONTI
INVENTORS

BY Karl F. Ross
Attorney

ENCODER FOR HIGH-SPEED PCM SYSTEM

Our present invention relates to an encoder for telecommunication systems, in particular for pulse-code-modulation (PCM) systems serving to transmit wide-band (e.g. video or multichannel audio) signals over telephone lines or radio links.

The encoding of such analog signals, i.e. the conversion of their periodically sampled amplitude values into binary code words, should take place at very high speeds consistent with transmission at a rate on the order of 50 to 1000 megabits per second (or bits/$\mu$s). Conventional logic circuitry suitable for this purpose is complex and expensive.

The general object of our invention, therefore, is to provide a relatively simple circuit arrangement suitable for such high-speed encoding.

More particularly, our invention aims at providing an encoding logic with only a relatively small number of coincidence (AND or NAND) gates, all of the simple two-input type, for converting a considerably larger number of incremental amplitude values to binary form.

It is also an object of our invention to provide an encoder for this description which can be readily adapted to any of a variety of different coding characteristics, e.g. linear, logarithmic or mixed.

In accordance with this invention we provide an encoder designed to convert an analog signal, whose amplitude span is divided into $2^n$ amplitude ranges each in turn subdivided into $2^m$ amplitude levels, into a code word of $n + m$ bits by feeding the analog signal in parallel to a group of $2^n$ comparison stages (one for each range) each consisting of a set of $2^m$ comparators; each comparator has a first input connected to the source of analog signal and a second input biased by a respective reference potential. The magnitudes of these reference potentials vary progressively from the lowest-ranking comparator of the lowest-ranking stage to the highest-ranking comparator of the highest-ranking stage, each comparator generating a finite output whenever the applied signal voltage is at least equal to the corresponding reference potential. Logical circuitry connected to these comparators derives from their finite outputs a first combination of *n* bits, indicating the highest-ranking stage in which a finite output is generated, and a second combination of *m* bits, indicating the highest-ranking comparator generating such finite output in the stage indicated by the *n*-bit combination.

Even though the amplitude of the sampled input signal remains virtually constant throughout a coding period, a comparator with a threshold substantially equal to that amplitude may have an uncertain output vacillating between "0" and "1". To prevent the occurrence of coding errors due to such uncertainties, we prefer to insert an individual flip-flop between each comparator and the logical circuitry for temporarily storing, under the control of a timer, the comparator output in an early part of the period. Just before the comparators are enabled by a reading pulse from the timer to set the associated flip-flops, all the flip-flops previously set are restored to normal by a resetting pulse which marks the beginning of each new coding period.

According to a more specific feature of our invention, the logical circuitry includes a pair of gating matrices, i.e. a first matrix connected to receive the $2^n-1$ outputs of the lowest-ranking comparators of all stages except the lowest-ranking comparison stage, to generate a range-indicating output, and a second matrix connected to receive the outputs of $2^m-1$ OR gates each having $2^n$ inputs connected to like-ranking comparators (other than the lowest-ranking ones) of all stages, thereby generating a level-indicating output which is independent of the amplitude range involved. Thus, the number of energized inputs of the first gating matrix may vary from 0 through $2^n-1$ whereas the number of such inputs at the second matrix ranges from 0 through $2^m-1$; these numbers can therefore be digitized in combinations of *n* and *m* bits, respectively, giving both the amplitude range and the level within that range. Since the encoder does not respond to amplitude levels lower than the threshold of the second-lowest comparator of the lowest-ranking stage, the bottom comparator of that stage is functionless and may be omitted. While such a supernumerary comparator may be included in stage No. 1 for the sake of standardization of manufacture, its inclusion in the circuit arrangement described hereinafter has mainly the purpose of facilitating uniform designations and the claims are to be interpreted with this proviso in mind.

The above and other features of our invention will be described in detail hereinafter with reference to the accompanying drawing in which.

Figure 1:
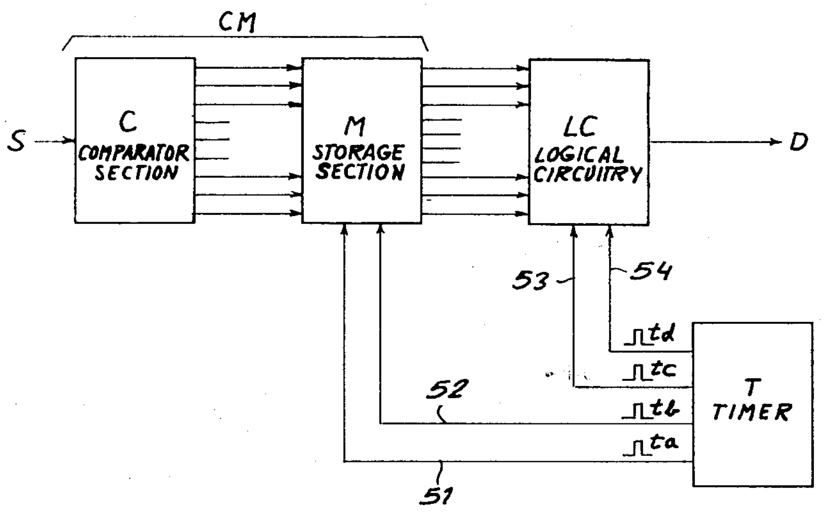
FIG. 1 is an overall block diagram of an encoder system according to our invention.

As illustrated in FIG. 1, an encoder according to our invention comprises three principal components, i.e. a comparator section C, a storage or memory section M and logical circuitry LC. A sampled analog signal S, applied to comparator section C, has its value temporarily stored in memory section M for subsequent digitization in logic LC; a time T, also controlling the periodic sampling of the analog signal in the input of section C by conventional means not illustrated, steps the storage section M and the logic LC via two pairs of leads 51, 52 and 53, 54 carrying relatively staggered pulses *ta*, *tb* (for section M) and *tc*, *td* (for logic LC). The binary output of that logic, collectively designated D, may be read out in parallel or converted into a serial succession of bits, again under the control of timer T, as is well known per se.

Figure 2:
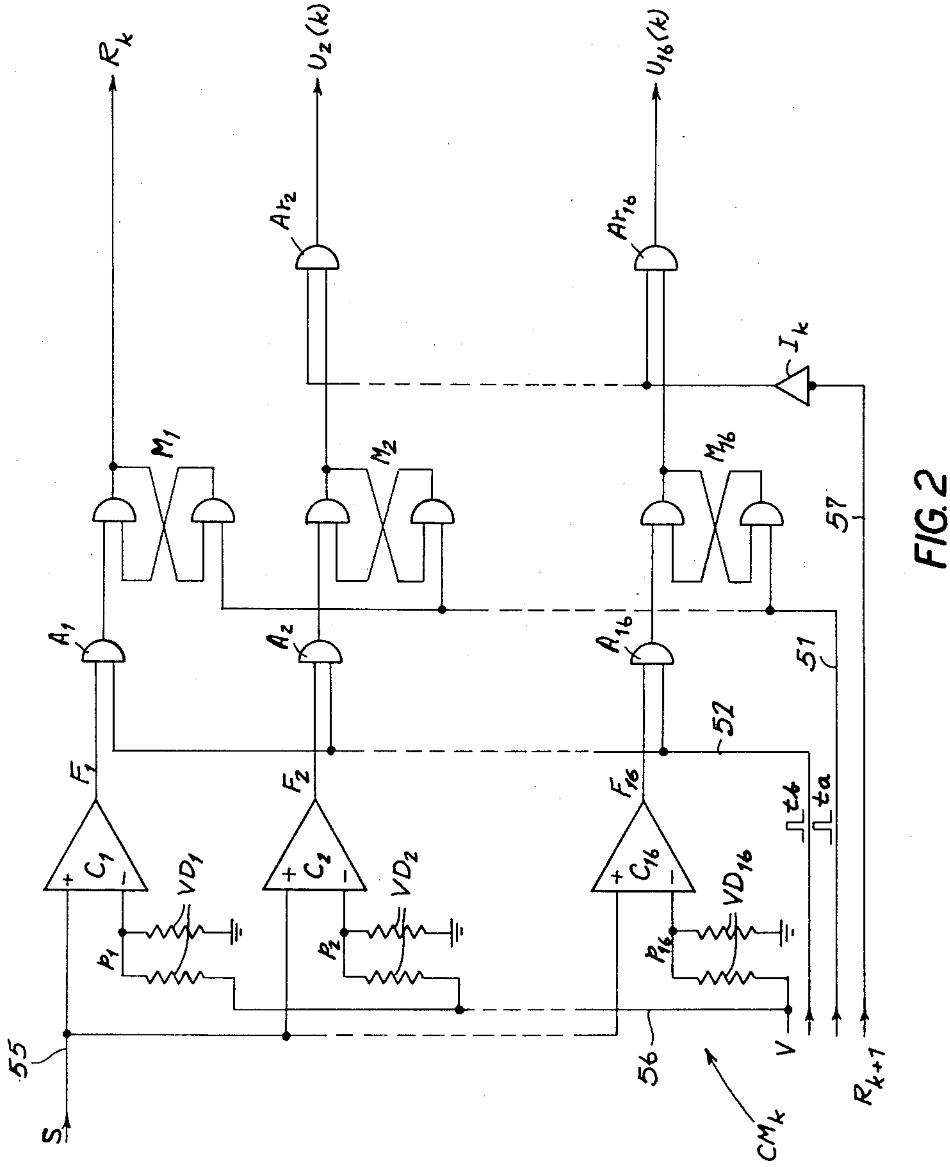
FIG. 2 is a more elaborate circuit diagram of a comparison stage included in the system of FIG. 1.
Figure 3:
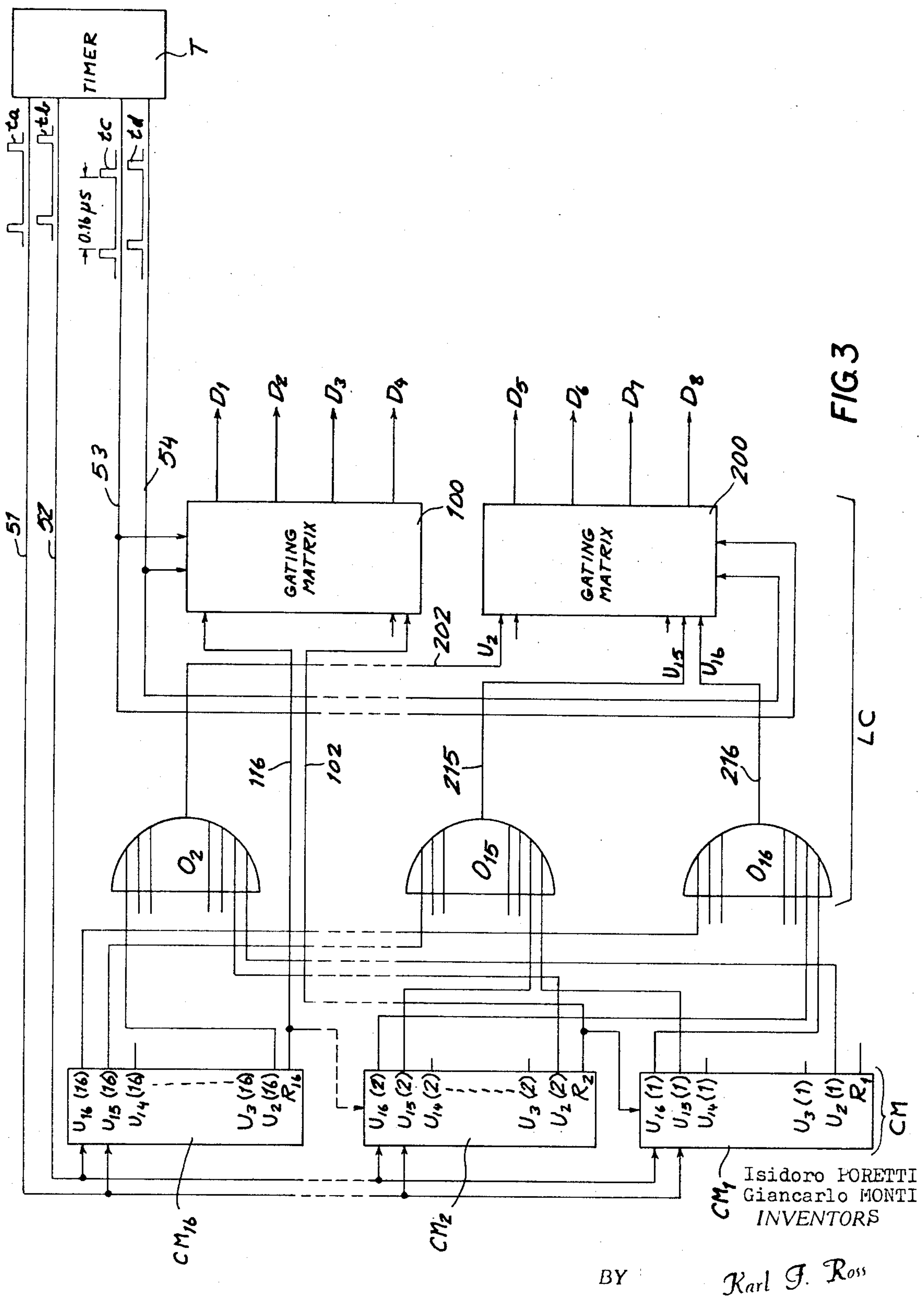
FIG. 3 is a more detailed overall diagram.

The two input sections C and M, collectively designated CM, and the output section LC have been shown in greater detail in FIG. 3. The encoder portion CM is divided into 16 comparison stages ($m = 4$) designated $CM_1$, $CM_2$, . . . $CM_{16}$. One of these comparison stages, generally designated $CM_k$, has been illustrated in FIG. 2 and is representative of any one of these stages, with certain exceptions noted hereinafter for the lowest-ranking stage $CM_1$ and the highest-ranking stage $CM_{16}$. It may be assumed that $m = n = 4$, i.e. that each of the 16 amplitude ranges corresponding to the several stages of FIG. 3 is subdivided into 16 amplitude levels as more fully described hereinafter with reference to FIG. 6. Thus, stage $CM_k$ comprises 16 comparators $C_1$, $C_2$, . . $C_{16}$ each having an additive input (+) and a subtractive input (−). The additive inputs are simultaneously energized via a lead 55 by the analog sample S supplied in parallel thereto; the subtractive inputs are biased by relatively staggered reference potentials $p_1$, $p_2$, . . . $p_{16}$ derived from respective voltage dividers $VD_1$, $VD_2$, . . $VD_{16}$ connected between ground and a common bus bar 56 carrying a d-c voltage V.

Whenever the signal level S equals or exceeds the reference potential $p_1$ etc. of any comparator, that comparator feeds a finite output voltage $F_1$, $F_2$, . . . $F_{16}$ to an input of an associated AND gate $A_1$, $A_2$, . . . $A_{16}$ whose other inputs are connected in parallel to lead 52 for periodic unblocking by the timer pulse *tb*. These AND gates work into the setting inputs of respective flip-flops or multivibrators $M_1$, $M_2$, . . . $M_{16}$ whose resetting inputs are connected in parallel to timer lead 51 carrying the pulse *ta*. The stored and quantized comparator readings, appearing on the set outputs of flip-flops $M_1$ etc., have been designated $R_k$ for the lowest-ranking comparator $C_1$ and $U_2$ (k) . . . $U_{16}$(k) for all the higher-ranking comparators $C_2$ . . . $C_{16}$. The "R" signal $R_k$ indicates by its presence that the amplitude of the sample S reaches into or surpasses the corresponding ($k^{th}$) range; the "U" signals ($U_2 - U_{16}$) indicate the highest level reached within that range and are, of course, all present if the signal amplitude exceeds the range.

Except in the case of the highest-ranking comparison stage $CM_{16}$, the outputs of flip-flops $M_2 - M_{16}$ pass through respective AND gates $Ar_2 - Ar_{16}$ which are connected in parallel, through an inverter $I_k$, to a lead 57 carrying the "R" signal $R_{k+1}$ of the next-higher stage. Thus, the "U" signals of stage $CM_k$ cannot reach the logic circuit LC if the analog amplitude reaches into or past the stage $CM_{k+1}$. This ensures that the logic considers only the level indication from the highest-ranking range marked by the comparison and storage network CM. The absence of any "U" signal in such a top-ranking range identified by an existing "R" signal indicates, of course, that the amplitude of the sample falls within the lowest level of that range.

In the lowest-ranking stage $MC_1$, the output $R_k = R_1$ is not utilized so that all or part of the signal path $C_1$, $A_1$, $M_1$ may be omitted, except to facilitate uniform mass-production of the several stages as noted above.

In FIG. 3 the output "R" and "U" of the stages $CM_1 - CM_{16}$ have been designated in the same way as in FIG. 2, except for a replacement of "*k*" by the number of the respective stage.

As further shown in FIG. 3, logic LC includes 15 OR gates $O_2$, . . . $O_{15}$, $O_{16}$, each with 16 inputs connected to receive the outputs of like-ranking comparators of the several stages, such as signals $U_2(1) - U_2(16)$ in the case of gate $O_2$ and $U_{16}(1)$-$U_{16}(16)$ in the case of gate $O_{16}$. A first gating matrix 100 has 15 input leads 102–116 connected to receive the range signals $R_2 - R_{16}$ from stages $CM_2 - CM_{16}$, respectively, these leads having extensions (57 in FIG. 2) transmitting the same signals to the respective next-lower stages. Matrix 100 derives from these input signals the first four bits $D_1 - D_4$ of the word D (FIG. 1) representing the digital equivalent of the analog signal S.

A second gating matrix 200 has 15 input leads 202, . . . 215, 216 emanating from the several OR gates $O_2$, . . . $O_{15}$, $O_{16}$ and carrying respective signals $U_2$, . . . $U_{16}$ which come into existence whenever any input of the corresponding OR gate is energized. Matrix 200 derives from these signals $U_2 - U_{16}$ the other four bits $D_5 - D_8$ of the word D.

Timer leads 51 and 52 are connected in parallel to all the stages $CM_1 - CM_{16}$ whereas timer leads 53, 54 are connected in parallel to both gating matrices 100 and 200. It will be noted that the pulses *ta*, *tb*, *tc* and *td*, appearing on these leads, are relatively staggered by a fraction of a repetition period here indicated, by way of example, as equaling 0.16 $\mu$s.

Figure 4:
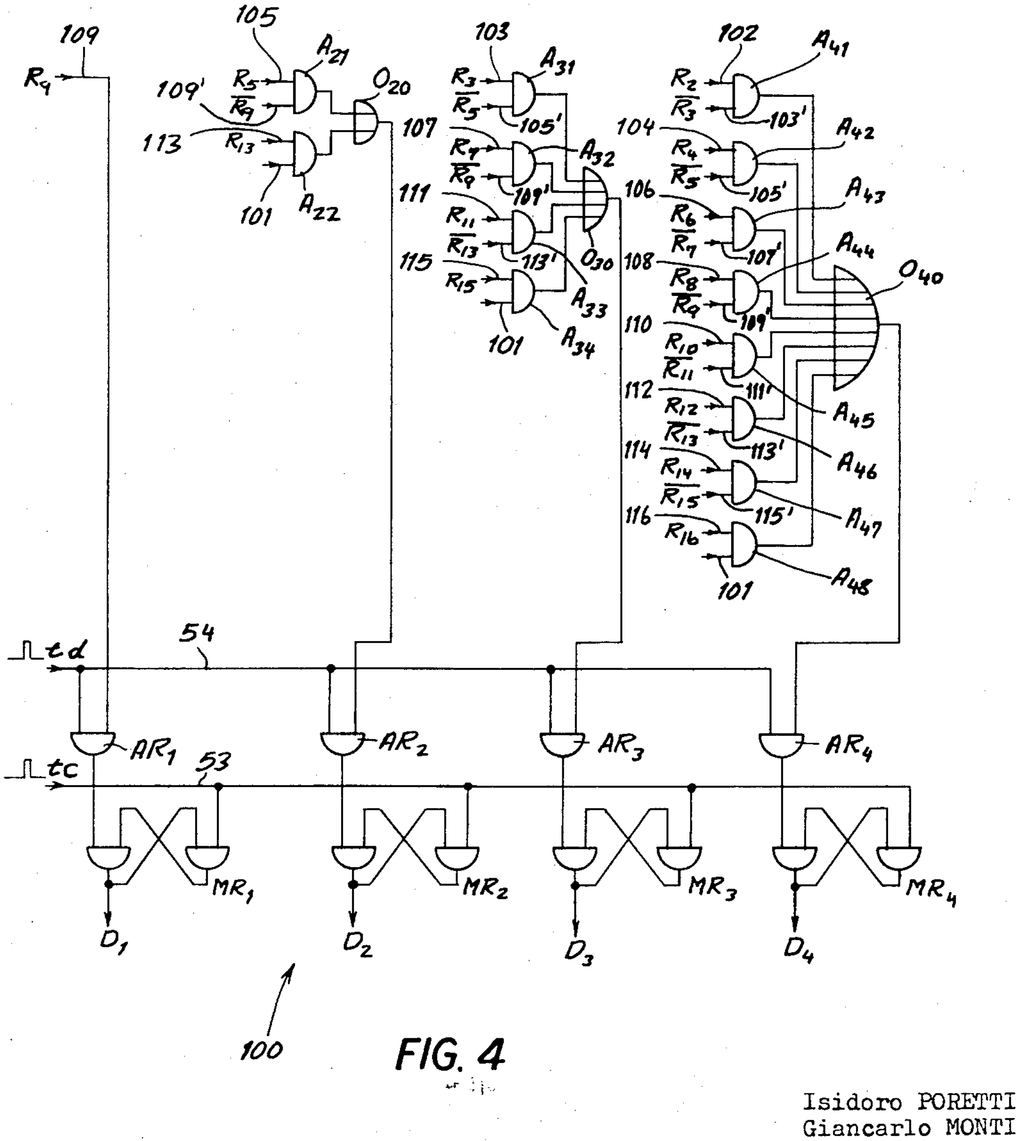

The construction of the gating matrix 100 is shown in FIG. 4. This matrix comprises four AND gates $AR_1$–$AR_4$ working into the setting inputs of respective flip-flops $MR_1$–$MR_4$ whose resetting inputs are all connected in parallel to lead 53 carrying the timer pulse *tc*. One input of each AND gate $AR_1$–$AR_4$ is connected to lead 54 whereby these gates are unblocked, just after the resetting of the associated flip-flops, by the timer pulse *td*. The set outputs of the flip-flops $MR_1$–$MR_4$ constitute the bits $D_1$–$D_4$, respectively.

AND gate $AR_1$ has its operating input connected directly to lead 109 to receive the signal $R_9$. The corresponding input of AND gate $AR_2$ is connected by an OR gate $O_{20}$ to the outputs of two AND gates $A_{21}$ and $A_{22}$. Gate $A_{21}$ has one input connected to lead 105 carrying the signal $R_5$ and has its other input connected to a lead 109' carrying the complement $R_9$ of signal $R_9$. Gate $A_{22}$ has an input connected to lead 113, carrying the signal $R_{13}$, and has another input tied to a constantly energized bus bar 101; it will be apparent that this gate could be replaced by a direct connection, except that the illustrated arrangement insures a more uniform voltage distribution.

In an analogous manner, gate $AR_3$ has an input energizable by way of an OR gate $O_{30}$ from a combination of four AND gates $A_{31}$, $A_{32}$, $A_{33}$ and $A_{34}$. Gate $A_{31}$ has inputs connected to leads 103 and 105' carrying signals $R_3$ and $R_5$, respectively. Gate $A_{32}$ has input leads 107 and 109' energizable by signals $R_7$ and $R_9$. Input leads 111 and 113' of gate $A_{33}$ receive signals $R_{11}$ and $R_{13}$. AND gate $A_{34}$ has only one active input lead 115 ($R_{15}$), its other input being permanently energized by bus bar 101; again, this gate could be omitted.

AND gate $AR_4$ has an analogous input connection, by way of an OR gate $O_{40}$, to eight AND gates $A_{41}$–$A_{48}$. Gate $A_{41}$ receives signals $R_2$ and $R_3$ via leads 102 and 103'. Gate $A_{42}$ has input leads 104 and 105' feeding in the signals $R_4$ and $R_5$. Leads 106 and 107' supply the inputs of gate $A_{43}$ with signals $R_6$ and $R_7$. Gate $A_{44}$ is energizable over leads 108 and 109' by signals $R_8$ and $R_9$. Gate $A_{45}$ has inputs connected to leads 110 and 111' carrying signals $R_{10}$ and $R_{11}$. Another pair of leads 112 and 113' supply the signals $R_{12}$ and $R_{13}$ to the gate $A_{46}$. The inputs of gate $A_{47}$ are tied to leads 114 and 115' supplying signals $R_{14}$ and $R_{15}$. Gate $A_{48}$, which again is redundant, has an active input lead 116 carrying the signal $R_{16}$, its other input being permanently energized over bus bar 101.

The operation of the logic of FIG. 4 has been summarized in the following truth table giving, for each of the 16 amplitude ranges I–XVI, the values of input signals $R_2$–$R_{16}$ and of the corresponding output signals $D_1$–$D_4$.

| | $R_2$ | $R_3$ | $R_4$ | $R_5$ | $R_6$ | $R_7$ | $R_8$ | $R_9$ | $R_{10}$ | $R_{11}$ | $R_{12}$ | $R_{13}$ | $R_{14}$ | $R_{15}$ | $R_{16}$ | $D_1$ | $D_2$ | $D_3$ | $D_4$ |
|---|---|---|---|---|---|---|---|---|---|---|---|---|---|---|---|---|---|---|---|
| I | 0 | 0 | 0 | 0 | 0 | 0 | 0 | 0 | 0 | 0 | 0 | 0 | 0 | 0 | 0 | 0 | 0 | 0 | 0 |
| II | 1 | 0 | 0 | 0 | 0 | 0 | 0 | 0 | 0 | 0 | 0 | 0 | 0 | 0 | 0 | 0 | 0 | 0 | 1 |
| III | 1 | 1 | 0 | 0 | 0 | 0 | 0 | 0 | 0 | 0 | 0 | 0 | 0 | 0 | 0 | 0 | 0 | 1 | 0 |
| IV | 1 | 1 | 1 | 0 | 0 | 0 | 0 | 0 | 0 | 0 | 0 | 0 | 0 | 0 | 0 | 0 | 0 | 1 | 1 |
| V | 1 | 1 | 1 | 1 | 0 | 0 | 0 | 0 | 0 | 0 | 0 | 0 | 0 | 0 | 0 | 0 | 1 | 0 | 0 |
| VI | 1 | 1 | 1 | 1 | 1 | 0 | 0 | 0 | 0 | 0 | 0 | 0 | 0 | 0 | 0 | 0 | 1 | 0 | 1 |
| VII | 1 | 1 | 1 | 1 | 1 | 1 | 0 | 0 | 0 | 0 | 0 | 0 | 0 | 0 | 0 | 0 | 1 | 1 | 0 |
| VIII | 1 | 1 | 1 | 1 | 1 | 1 | 1 | 0 | 0 | 0 | 0 | 0 | 0 | 0 | 0 | 0 | 1 | 1 | 1 |
| IX | 1 | 1 | 1 | 1 | 1 | 1 | 1 | 1 | 0 | 0 | 0 | 0 | 0 | 0 | 0 | 1 | 0 | 0 | 0 |
| X | 1 | 1 | 1 | 1 | 1 | 1 | 1 | 1 | 1 | 0 | 0 | 0 | 0 | 0 | 0 | 1 | 0 | 0 | 1 |
| XI | 1 | 1 | 1 | 1 | 1 | 1 | 1 | 1 | 1 | 1 | 0 | 0 | 0 | 0 | 0 | 1 | 0 | 1 | 0 |
| XII | 1 | 1 | 1 | 1 | 1 | 1 | 1 | 1 | 1 | 1 | 1 | 0 | 0 | 0 | 0 | 1 | 0 | 1 | 1 |
| XIII | 1 | 1 | 1 | 1 | 1 | 1 | 1 | 1 | 1 | 1 | 1 | 1 | 0 | 0 | 0 | 1 | 1 | 0 | 0 |
| XIV | 1 | 1 | 1 | 1 | 1 | 1 | 1 | 1 | 1 | 1 | 1 | 1 | 1 | 0 | 0 | 1 | 1 | 0 | 1 |
| XV | 1 | 1 | 1 | 1 | 1 | 1 | 1 | 1 | 1 | 1 | 1 | 1 | 1 | 1 | 0 | 1 | 1 | 1 | 0 |
| XVI | 1 | 1 | 1 | 1 | 1 | 1 | 1 | 1 | 1 | 1 | 1 | 1 | 1 | 1 | 1 | 1 | 1 | 1 | 1 |

Figure 5:
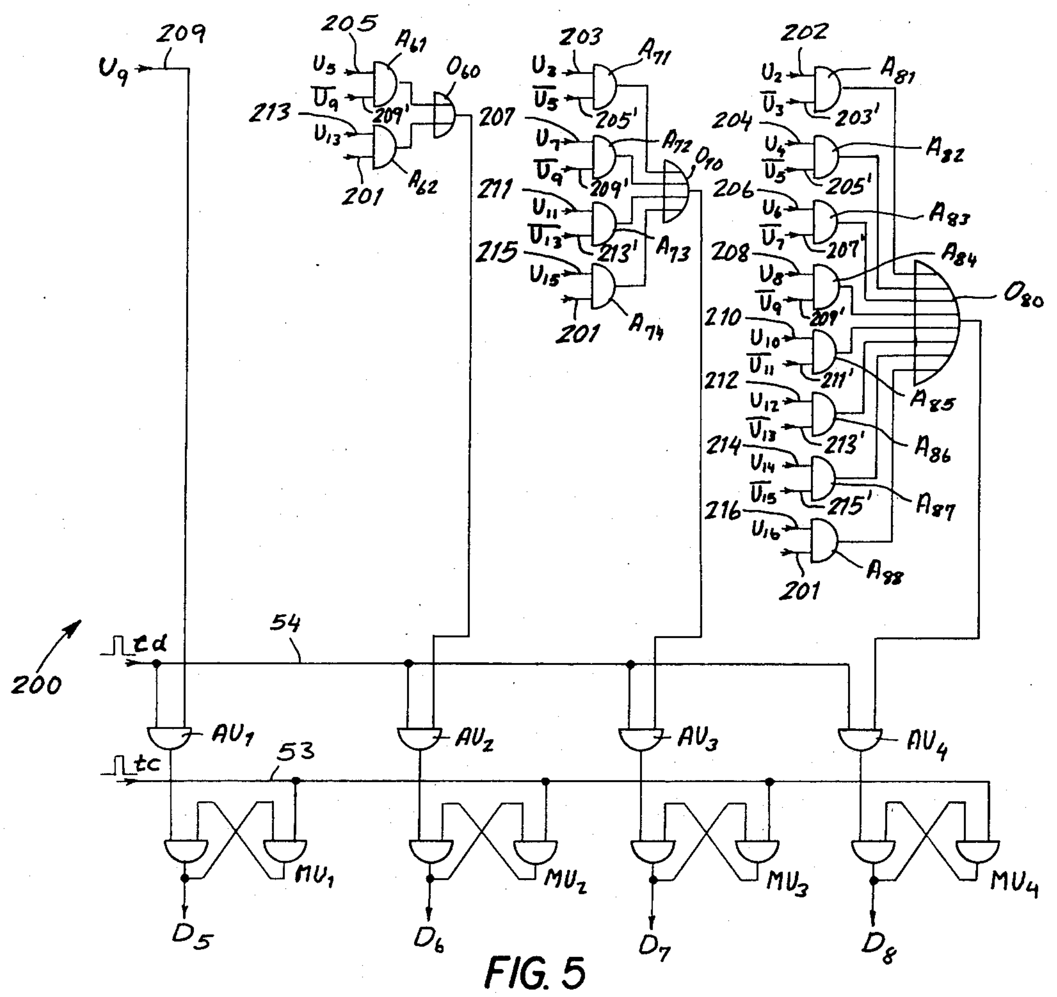
FIGS. 4 and 5 are circuit diagrams of two logic matrices included in the system of FIG. 1.

As shown in FIG. 5, gating matrix 200 has the same layout as matrix 100, including four flip-flops $MU_1$–$MU_4$ delivering bits $D_5$–$D_8$ under the control of AND gates $AV_1$–$AV_4$ which are unblocked by pulse *td* on lead 54 immediately after the resetting of the flip-flops by pulse *tc* on lead 53. Gate $AU_1$ receives the signal $U_9$ directly via lead 209. Gate $AU_2$ is energizable by signals $U_5$, $U_9$ and $U_{13}$ via a pair of AND gates $A_{61}$ and $A_{62}$ working into an OR gate $O_{60}$. Four AND gates $A_{71}$–$A_{74}$, in tandem with an or gate $O_{70}$, control the AND gate $AU_3$ in response to signals $U_3$, $U_5$, $U_7$, $U_9$, $U_{11}$, $U_{13}$ and $U_{15}$. Gate $AU_4$ is similarly controlled, in response to signals $U_2$, $U_3$, $U_4$, $U_5$, $U_6$, $U_7$, $U_8$, $U_9$, $U_{10}$, $U_{11}$, $U_{12}$, $U_{13}$, $U_{14}$, $U_{15}$ and $U_{16}$, via AND gates $A_{81}$–$A_{88}$ and an OR gate $O_{80}$. The several input leads of these AND gates have the same designation as in FIG. 4 with replacement of the "1" in the hundreds digit by "2".

Naturally, the truth table given above with reference to FIG. 4 applies also to the circuitry of FIG. 5, with replacement of $R_2$–$R_{16}$ by $U_2$–$U_{16}$ and $D_1$–$D_4$ by $D_5$–$D_8$; the 16 rows of the table then indicate the amplitude levels in lieu of the ranges.

The eight bits $D_1$–$D_8$ may be read out sequentially at a rate of 50 Mbit/sec.

Figure 6:
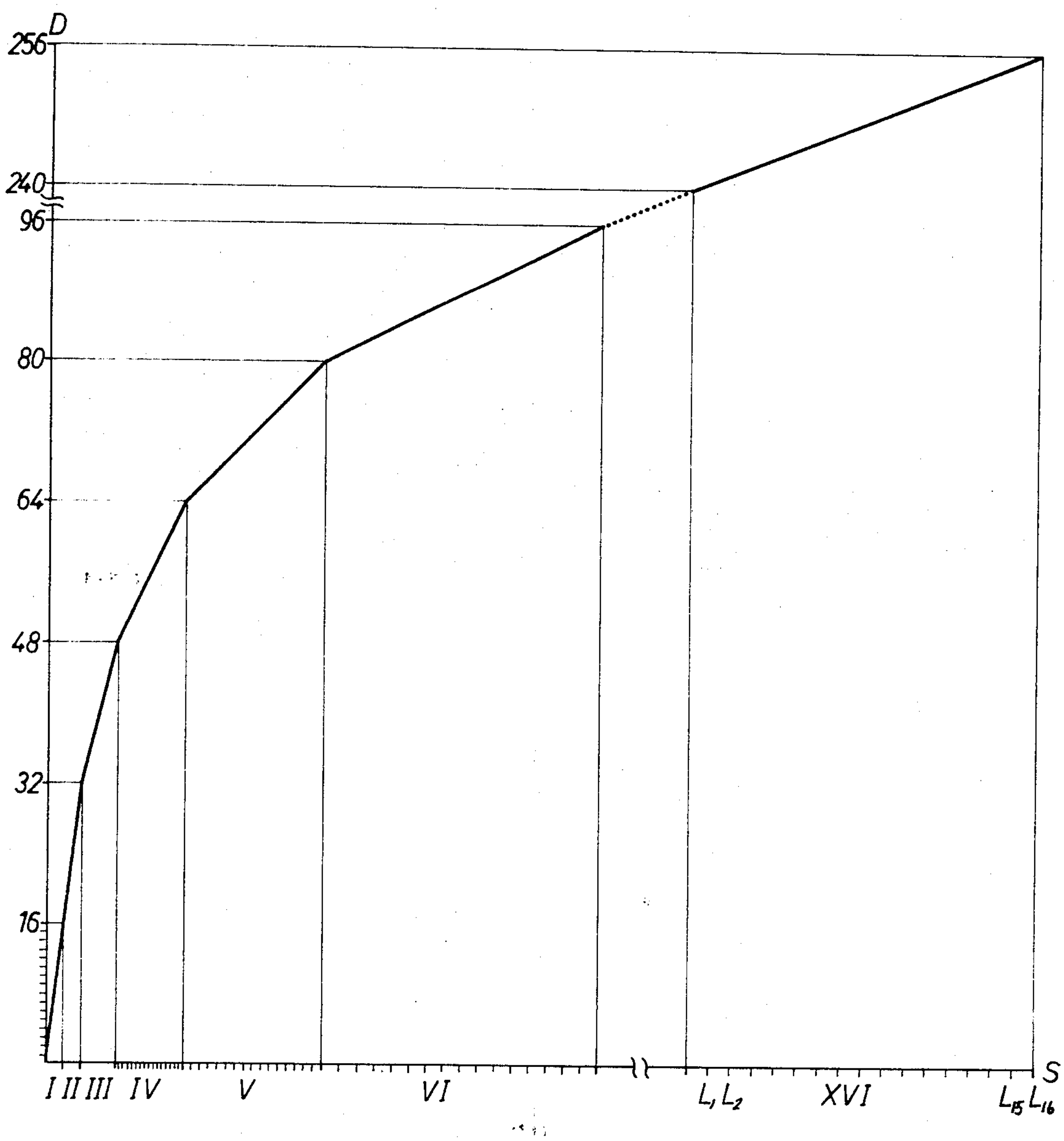
FIG. 6 is a graph of a coding characteristic representative of the operation of the system.

In FIG. 6, we have shown a compression characteristic representative of a law of coding suitable for the encoder illustrated in FIGS. 1–5. The analog signal S, plotted along the abscissa, spans 16 ranges I–XVI of progressively increasing spread, except for the two lowermost ranges I and II which are of the same width. Each range is subdivided into 16 incremental steps or levels designated $L_1$–$L_{16}$; in this particular instance, the levels within each range are of uniform width, the quantized output D of the encoder, plotted along the ordinate, may assume any one of $2^8$=256 different values corresponding to the more generalized term $2^{m+n}$.

Naturally, the number of ranges as well as the number of levels per range may be altered, as may be the relative widths thereof. It will also be apparent that, as is well known per se, a separate sign bit may be generated to indicate the polarity of the sample.

We claim:

1. An encoder for converting an analog signal into a code word of *n+m* bits identifying one of $2^n$ amplitude ranges and one of $2^m$ amplitude levels within each range, comprising a group of $2^n$ comparison stages each assigned to a respective amplitude range;

a set of $2^m$ comparators in each of said stages, each comparator having a first and a second input;

feed means for supplying an analog signal to all said first inputs in parallel;

biasing means for applying respective reference potentials to said second inputs, said potentials being of progressively higher magnitudes corresponding to the $2^{n+m}$ amplitude levels encompassed by said $2^n$ ranges, each comparator generating a finite output upon the magnitude of said analog signal at least equaling the reference potential applied to its second input;

logical circuitry connected to said comparators for converting said finite outputs thereof into a first combination of *n* bits, indicating the highest-ranking comparison stage in which a finite output is generated, and a second combination of *m* bits, indicating the highest-ranking comparator generating such finite output in the indicated stage;

an individual flip-flop inserted between each comparator and said logical circuitry for temporarily storing the output of the associated comparator; and timer means for periodically resetting said flip-flops;

said logical circuitry including gating means connected to receive the outputs of the comparators of every comparison stage except the lowest-ranking one, the lowest-ranking comparator of every comparison stage except the lowest-ranking stage being connected to said gating means of the next lower stage for blocking same in the presence of a finite output of said lowest-ranking comparator;

said gating means including $2^m$–1 OR gates, each with $2^n$ inputs connected to like-ranking comparators of all said stages other than the lowest-ranking comparators, a first gating matrix connected to receive the outputs of said lowest-ranking comparators for deriving therefrom said first combination of *n* bits, and a second gating matrix connected to receive the outputs of all said OR gates for deriving therefrom said second combination of *m* bits.

2. An encoder as in claim 1, further comprising normally blocked coincidence gates interposed between said comparators and the associated flip-flops, said timer means being connected in parallel to said gates for periodically unblocking same.

3. An encoder as defined in claim 1 wherein said logical circuitry further includes a first set of bistable circuits connected to said first gating matrix for registering said *n* bits and a second set of bistable circuits connected to said second gating matrix for registering said *m* bits.

4. An encoder as defined in claim 1 wherein *m* = *n*, said gating matrices being of identical construction.

* * * * *